Oct. 27, 1959 D. T. BEST 2,910,671

MEMORY SYSTEM

Filed Feb. 10, 1956 5 Sheets-Sheet 1

INVENTOR.
DONALD T. BEST
BY Lawrence R. Brown
ATTORNEY

Oct. 27, 1959 D. T. BEST 2,910,671

MEMORY SYSTEM

Filed Feb. 10, 1956 5 Sheets-Sheet 2

*INVENTOR.*
DONALD T. BEST

*BY* Lawrence R. Brown

ATTORNEY

*INVENTOR.*
DONALD T. BEST
*BY* Lawrence R. Brown
ATTORNEY

MEMORY SYSTEM

Filed Feb. 10, 1956

INVENTOR.
DONALD T. BEST
BY
Lawrence R. Brown
ATTORNEY

*INVENTOR.*
DONALD T. BEST

BY Laurence R. Brown

ATTORNEY

United States Patent Office 2,910,671

Patented Oct. 27, 1959

2,910,671

MEMORY SYSTEM

Donald T. Best, Philadelphia, Pa., assignor to Burroughs Corporation, Detroit, Mich., a corporation of Michigan Application February 10, 1956, Serial No. 564,744

9 Claims. (Cl. 340—174)

This invention relates to memory systems for electronic computers, and more particularly it relates to magnetic recording arrangements for storing information in a plurality of address locations.

In general, electronic computers are provided with instructions which designate certain commands and contain portions for identifying address locations in a storage device. The address instruction generally comprises a multi-digit numerical character which specifies the maximum number of storage bins available. Thus, for example if decimal numbers were used to signal the address in a computer, two decimal numbers will identify 100 different storage bins. A computer, therefore, which is designed for a given number of storage locations has built in control circuits available for processing only a certain maximum number of control address character digits. Therefore, should it be desired to expand the memory of the given system, it would be required not only to provide more storage memory bins but when employing conventional techniques, it would require the provision of further complex control circuitry and possible changes in logic of the machine operation because of the requirement for further address digits.

Also in connection with expanding the memory capacity of existing machines, it is desirable to retain compatibility in the address designation so that existing programs or instructions will not need to be rewritten in terms of expanded memory instructions. Accordingly, it is desirable to provide memory devices of two different storage capacities in an electronic computer wherein the same instructions may be written to designate similar programs in the machines of either of the storage capacities.

It is, therefore, an object of the present invention to provide improved memory systems for electronic computer systems.

A further object of the invention is to provide computer systems capable of operating with memory devices of two different storage capacities in a compatible manner.

It is a still further object of the invention to provide increased storage capacity in electronic computers wherein existing control circuitry may be utilized.

Accordingly, there is provided in accordance with the present invention, a memory system with increased storage capacity for electronic computers such as that described and claimed in the copending application for United States Patent of George G. Hoberg et al., Serial No. 492,062 filed March 4, 1955, and assigned to the same assignee as the present application. In a computer of this type provision is made with proper control circuitry for the maximum storage capacity possible with a two decimal digit address instruction (*a*, *b*) i.e., 100 memory storage bins. In accordance with the present invention, therefore, provision is made for using identical instructions and yet providing a memory of increased capacity such as, for example, 220 memory locations. This is accomplished in general by utilizing an existing number of memory channels and their corresponding storage bins as invariable memory locations, and providing for replacement of the remaining channels by a group of memory bands which may be selected by simplified band switching circuitry. In this manner a plurality of memory bands may be switched into an existing memory location and made accessible by already provided address characters and control circuits so that compatibility of machine instruction is maintained and simplicity of control circuitry is effected without the provision of increased address character capacity with attendant control circuits.

The foregoing features together with further objects and advantages of the invention are explained hereinafter in detail with reference to the accompanying drawings wherein.

Figure 1:
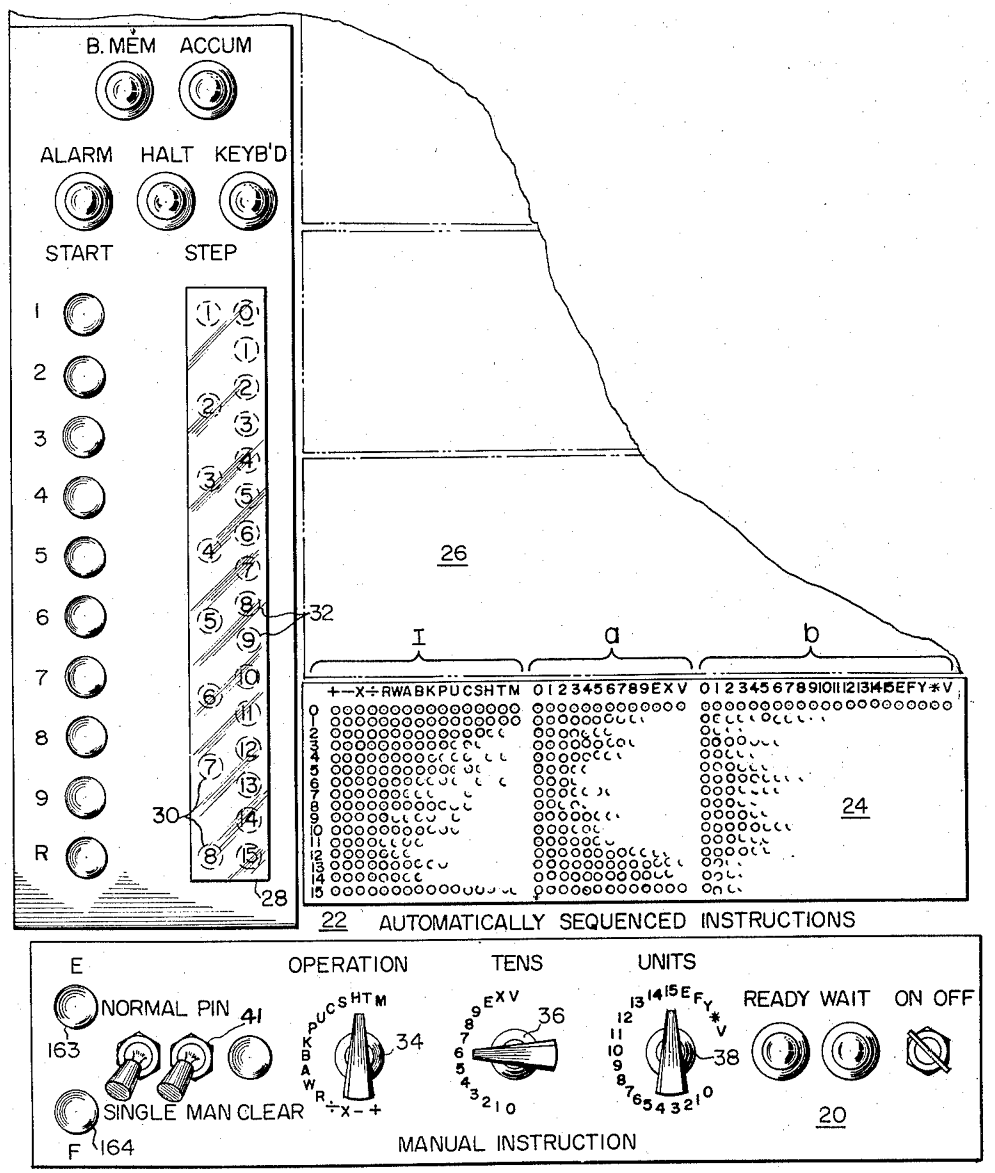
Fig. 1 is a diagrammatic view of a typical computer programming panel.

The control panel of Fig. 1 provides in sections 20 and 22 respectively manual and automatically sequenced instructions for operation of an electronic computer such as that mentioned in the above cited copending application. The automatically sequenced instructions are specified in a plurality of pinboards 24, 26 etc. and the lamps in panel 28 designate the particular program step being sequenced at any particular time by the computer. Thus, in the presently shown embodiment, provision is made for scanning eight separate pinboards as indicated by the left hand lamps 30 wherein each pinboard has sixteen separate instructions as specified by the right hand indicator lamps 32.

In each pinboard, three sections I, *a* and *b* are provided for respectively designating the particular computer instruction together with the tens and units level of the storage address location. Thus, the I*ab* instruction +35 would designate that the number in memory location 35 should be added to the contents of the accumulator. Since only two decimal digits *a* and *b* are provided for specifying memory locations, the capacity of a memory for the existing control circuitry of this computer is considered to be 100 storage locations. The presence of the numbers 10 through 15 in the pinboard section *b* is for use in operations other than the designation of addresses so that these additional numbers are not used for specifying memory locations. In actual operation the memory may be considered to have channels and bins respectively located in tracks and sector locations within the tracks recorded upon a magnetic drum. Thus, the tens level instruction digit *a* would designate which of the respective magnetic drum tracks should be selected, whereas the instruction digit *b* would designate in which sector of the track the selected storage location is found. As shown in Fig. 1 any of the instructions, which may be specified by the automatically sequenced instructions repertoire set up in the pinboards 24 etc., may also be manually specified by means of control switches 34, 36 and 38 whenever the toggle switch 41 specifies manual control of the computer.

Figure 2:
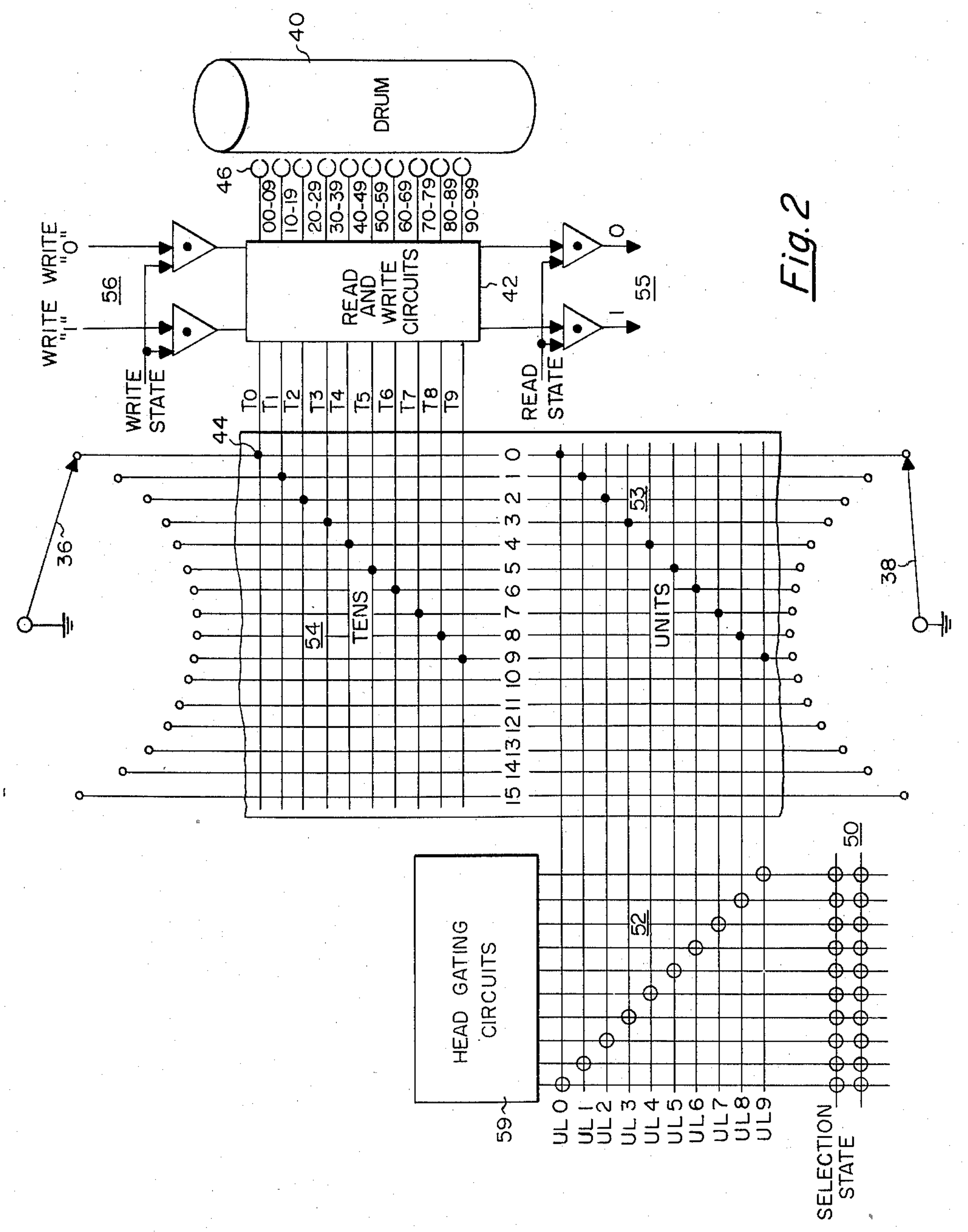
Fig. 2 is a schematic diagram of a magnetic drum memory system adapted for selection of specified memory addresses.

It is seen from the foregoing discussion therefore that the address location on a magnetic drum may be specified by either the pinboard or manual instruction switches. Control circuits such as indicated in Fig. 2 are used for address selection wherein only the tens and units level manual switches 36 and 38 are illustrated for specifying particular memory locations upon the magnetic drum 40 by means of intermediate read and write circuits 42 and head gating circuits 59. It is seen from the array of matrix wires that each dot 44 represents an interconnection such as might be made by a crystal diode which permits signals to flow through that interconnection whenever the proper voltage conditions exist such as a ground connection as established by the tens level selection switch 36. Also, conduction along the "0" column of the units level is possible in the same manner by the specified positioning of units selecting switch 38. As seen from the drawing, each of the tens level selections specifies selection of a corresponding one of the magnetic heads 46 associated with the drum 40 to define respective recording tracks $T_0$ through $T_9$ thereupon. Each of the units level output leads to the head gating circuits 59 is actuated by means of control or timing pulses on the magnetic drum at corresponding leads in the matrix section 52 specified UL0 through UL9, at those times in the drum rotation when a specified one of the storage bins is presented to the corresponding head 46 associated with the selected track. Thus, when some computer instruction sets up a selection state in the computer as specified by gating circuits 50, the timing pulses in matrix unit 52 connect in those units level leads set up in matrix 53 by the selector switch 38 so that the heads 46 are gated in by gating circuits 59. Thus, as the appropriate sector is presented along the track selected by matrix 54, signals are supplied to the read output leads 55 when the read operation is specified, and are accepted at the input leads 56 when the write operation is specified. Accordingly, any one of the 100 address selections 00 through 99 of the 10 tracks along drum 40 may be specified by setting of the switches 36 and 38 or by corresponding pinning of the numbers in sections *a* or *b* of that pinboard which is being scanned at any one particular time. Accordingly, each track is supplied with an address designation such as indicated at the leads connected to the magnetic heads 46.

Figure 3:
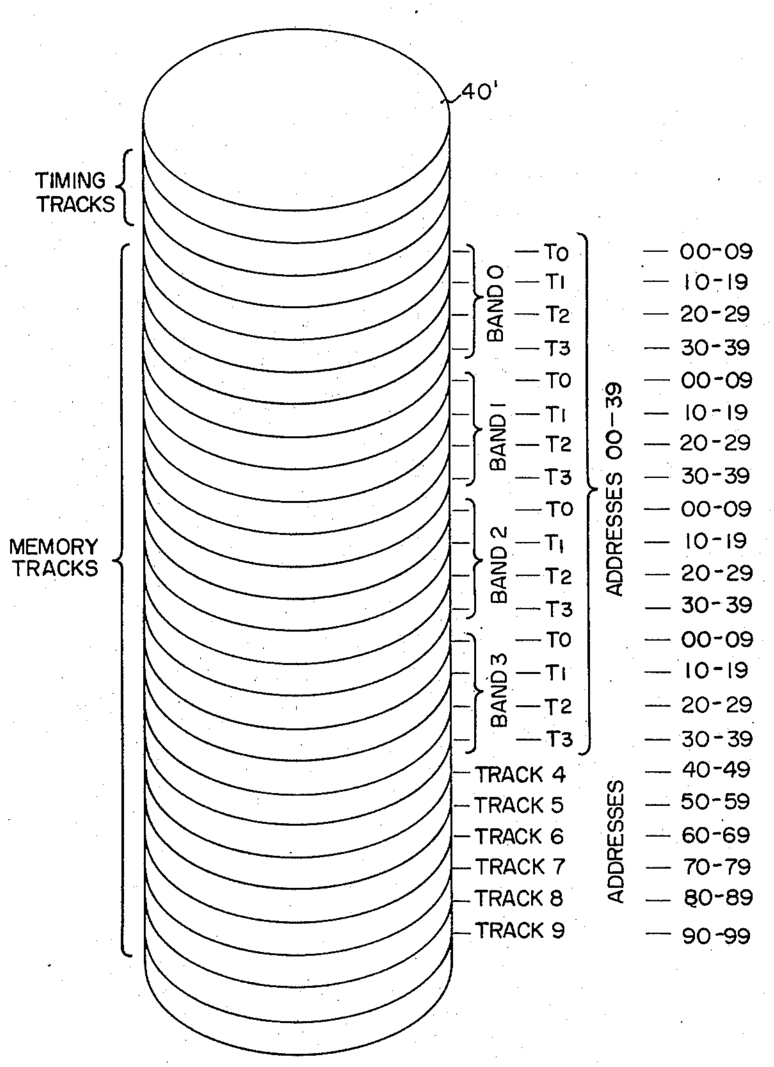
Fig. 3 is a diagrammatic view of a magnetic drum storage arrangement for improved memory techniques afforded by the invention.

As seen in Fig. 3 there is provision for 22 different recording tracks upon the modified drum 40'. With the specified ten storage bins for each track, this permits storage of 220 words in separate address locations. In order to retain compatibility of instructions with the 100 word memory hereinbefore described, 16 of the storage tracks are broken up into bands 0 through 3. Thus, any one of the four bands may be selected to supply the first four tracks $T_0$ through $T_3$ of Fig. 2 specified by the memory address tens digits of 0 through 3. From the drawing of Fig. 3 it is seen that each band therefore has designated tracks numbered from $T_0$ through $T_3$ whereas tracks 4 through 9 are permanently connected for selection by the corresponding addresses 40 through 99. Accordingly, the address 00 through 39 may designate information lying in any one of the bands 0 through 3 and separate provision must be made for selecting the desired band. In this manner whenever it is desired to step from one memory band to another, an address instruction may be given. Accordingly, control circuitry in the computer is extremely simplified in that a special switching matrix together with appropriate control circuitry is not necessary for specifying the added memory locations. In addition, with whichever band that is selected at a particular time, the fixed memory tracks $T_4$ through $T_9$ cooperate to provide a 100 word memory location completely compatible with that of the existing computer so that the existing address circuits are entirely adequate for selecting the desired memory locations, and a new instruction repertoire is not necessary. Accordingly, no special training of operators is necessary for enabling them to distinguish between the use of machines with 100 or 220 word memories.

Figure 4:
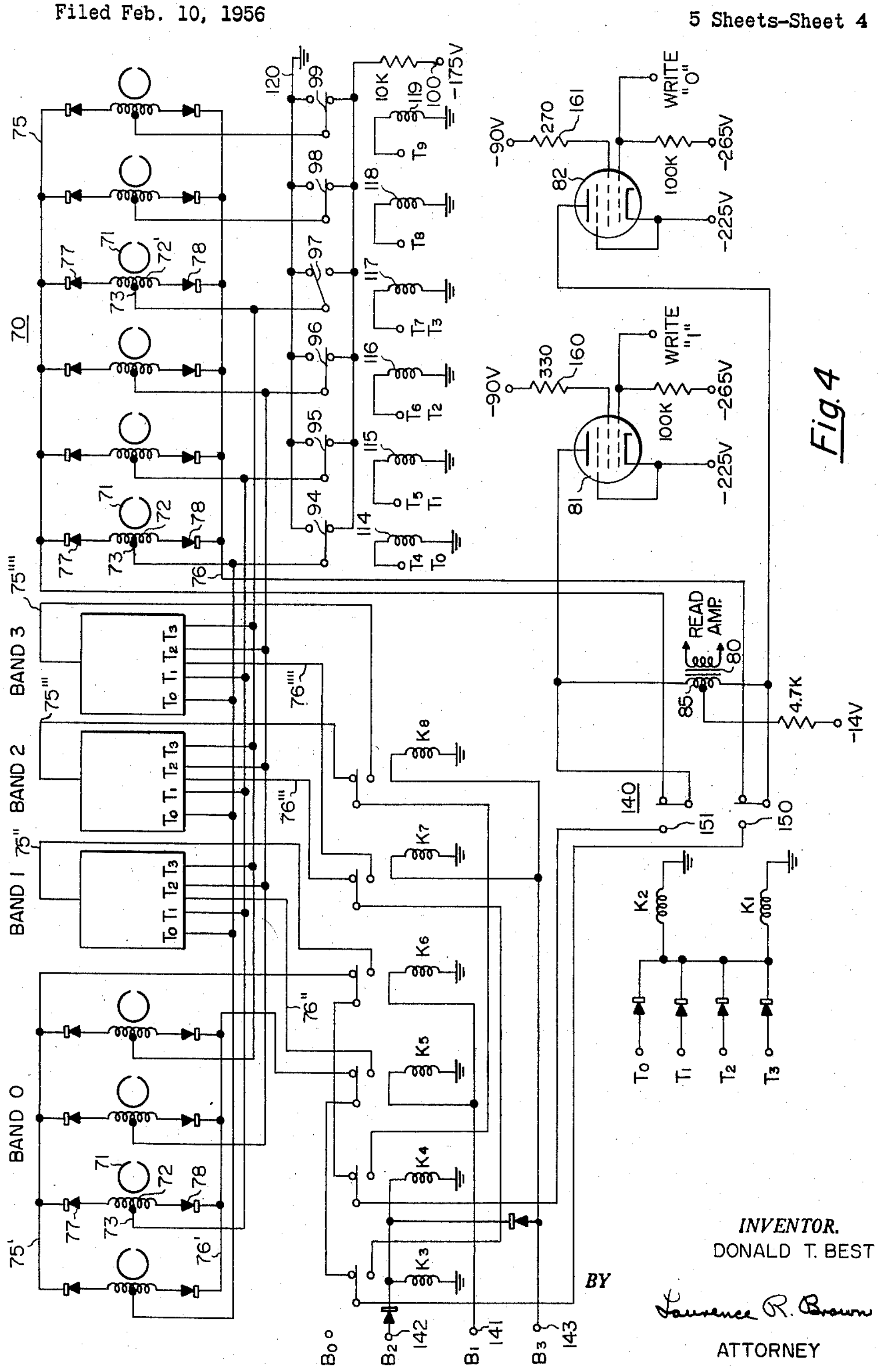
Fig. 4 is a schematic diagram of address selection circuits afforded in accordance with the present invention.

The circuits shown in Fig. 4 indicate the manner of selecting different memory tracks of a 22 channel memory system utilizing four optional bands 0, 1, 2 and 3 of four channels each and a fixed group 70 of six channels. Each channel has a separate reading head 71 together with a corresponding winding 72 having a center tap 73. The switching selection of the respective channels is made in the general manner described and claimed in the copending application for United States patent of George G. Hoberg, Serial No. 315,892 filed October 15, 1952, and assigned to the same assignee as the present application. In this selection scheme each winding 72 is connected to a pair of buses 75 and 76 by a corresponding pair of crystal diodes 77 and 78. The respective buses 75 and 76 are coupled to both a transformer 80 for producing a reading signal in response to signals induced in the head winding 72, and to the write "1" and write "0" circuits utilizing amplifier tubes 81 and 82. The voltages at the read amplifier primary winding 85 and at the write amplifier tubes 81 and 82, are selected such that the diodes 77 and 78 are blocked whenever any of the track selection switches 94 through 99 are in their normally closed position and connected to the −175 volt terminal 100 as shown for switches 94 to 96 and 98 to 99 in Fig. 4. Switch 97 may be actuated by either of the track signals $T_3$ or $T_7$. When $T_3$ energizes relay 117 to close switch 97 the switches at terminals 150 and 151 will also close and a winding like 72' will be selected from one of the bands 0 to 3 depending upon the signal $B_0$ to $B_3$ existing at the time of selection as will be explained hereinafter. However, when the center tap of a particular winding 72' is selected by a relay solenoid 117, so that the center tap is connected to the grouned bus 120, the diodes 77 and 78 are unblocked and this permits either a reading signal to be developed at the read amplifier transformer 80 or a writing signal at a respective half of the head winding 72' to be developed if a signal appears at either tube 81 or 82. Accordingly, by actuation of one of the relay solenoids 114 through 119 with tens level address signals specifying the selection of one of the tracks $T_0$ through $T_9$, a particular transducer head 71 is selected for both reading and writing operation. Normally the track signals $T_0$ through $T_9$ will be obtained whenever the tens level at the pinboard section *a* or manual instruction switch 36 as shown in Fig. 1 are specified. Therefore, the circuits of Fig. 4 are those circuits generally specified as the read and write circuits 42 shown in Fig. 2.

In normal operation separate track selection relays are required for each of the ten tracks specified by instruction numbers. In the present band switching system afforded by this invention, however, it has been found that the solenoids 114 through 117 may be used to select not only the usual tracks 4 through 7 but also the further tracks 0 through 3 since there is only one signal received at terminals $T_0$ to $T_7$ for track selection one of the mutual terminals $T_0$ and $T_4$, $T_1$ and $T_5$, $T_2$ and $T_6$, $T_3$ and $T_7$ will be active and operate the selected solenoid. This is possible because of the control circuitry 140 including relays $K_1$ through $K_8$ generally provided to indicate the selection of the groups of channels in a respective one of the bands 0, 1, 2 and 3. In general, the switching circuits of relay solenoids $K_1$ through $K_8$ are not actuated and are in the positions as shown in Fig. 4 to connect the four channels of band 0 together with the six channels of the fixed band 70 into the available memory system. When a track $T_0$ to $T_3$ of one of the bands 0 to 3 is to be selected the switches at terminals 150 and 151 will be switched to the band control circuitry 140 by the track signal $T_0$ to $T_3$. The actual track selected will depend upon which of the band selection signals $B_0$ to $B_3$ was previously made active at the time of track selection. The manner in which band selection is made is explained hereinafter. Therefore, band selection signals $B_1$, $B_2$ or $B_3$ are necessary to terminals 141 through 143 respectively for designating substitution of bands 1, 2 or 3 in the place of band 0. These signals actuate corresponding ones of the relay solenoids $K_3$ through $K_8$ in order to provide connection of corresponding ones of the buses 75 and 76 to the terminals 150 and 151 presented by the operated position of relay solenoids $K_1$ and $K_2$ for connection with the write amplifier tubes 81 and 82 and the read amplifier transformer 80. Thus, whenever tracks $T_0$ through $T_3$ are selected, operational signals are received for relay solenoids $K_1$ and $K_2$ to transfer control of the reading and writing circuits to the selected band 0 through 3 rather than the fixed band 70. The band signal $B_0$ through $B_3$ also specify operation of relay solenoids $K_3$ through $K_8$ for specification of the properly selected bands. It is noted in general that the selection of relay solenoids $K_1$ through $K_8$ should be made at a time before the selection of track solenoids 114 through 119 to avoid any possibility of erroneous signals or switching noises.

Write amplifiers 81 and 82 are identical with the exception of the screen grid dropping resistors 160 and 161. It has been found that when writing "0," the requirement that a one be erased is more expeditiously met by providing more driving power to the write "0" circuit 82. Therefore, the degenerative screen dropping resistor 161 is of lower ohmic value than that of the write "1" tube 81.

As seen from Fig. 2, the head gating circuits 59 are selected in accordance with signals from the units level of pinboard section *b* or manual instruction switch 38. Thus, for each selected channel or track on the magnetic drum one of the 10 corresponding storage bins may be selected so that a 22 track drum provides a maximum of 220 stored words in the illustrated system.

Figure 5:
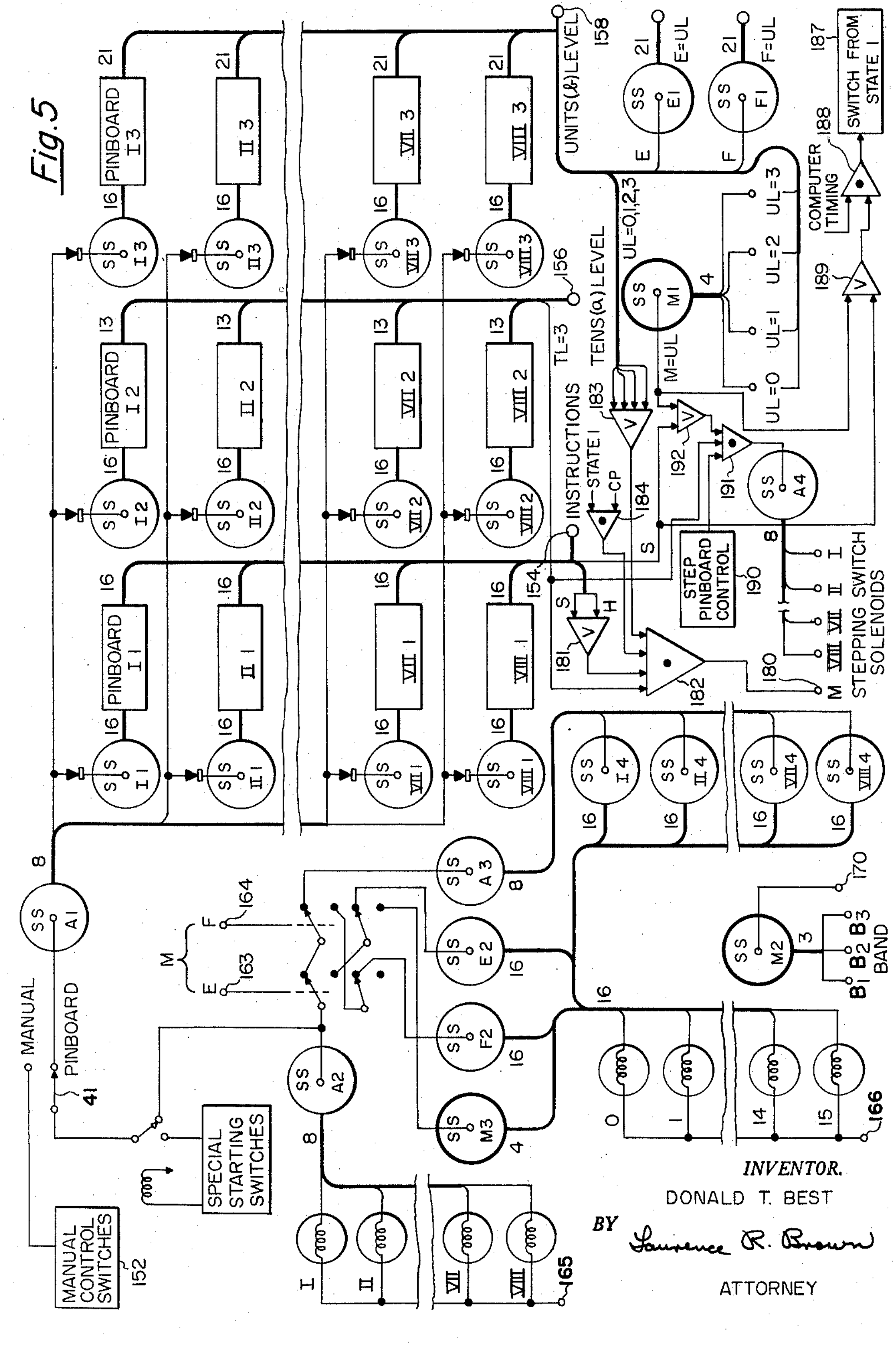
Fig. 5 is a logical circuit diagram of control circuits for use in specifying memory address locations in accordance with the present invention.

In order to simplify the control circuits and provide a minimum of switching circuits of the type shown in Fig. 4 for selecting the particular optional memory bands, the instruction control circuitry of Fig. 5 may be utilized. In this diagram, which is related to the control functions and pinboard system specified in Fig. 1, the drawing is simplified wherever convenient by indicating a plurality of leads by a heavy line together with a number designating the respective leads. Each of the pinboard sections are numbered 1, 2 and 3 respectively and the different pinboards are numbered I through VIII. Likewise, the stepping control switches are designated for these corresponding pinboards by the same terminology SSI–1 etc. Further stepping control switches are appropriately designated and will be described generally hereinafter. In particular, the switches designated to indicate the memory bands are shown in heavy line form and are designated as stepping switch sections SSM–1, SSM–2 and SSM–3. As with the other switches, each circle represents a different level switching circuit actuated by the same solenoid so that stepping switch sections M1, M2 and M3 would be simultaneously controlled by the M stepping switch solenoid.

Provision for manual and pinboard operation is made by means of the switch 41 which optionally connects in the pinboard section or manual control switches 152 which produce the same control signals at the instructions, tens level and units level terminals 154, 156 and 158 respectively at the output leads of the respective pinboards as determined by proper operation of the A stepping switch levels SSA1 to SSA4 and the corresponding selected pinboard stepping switches I through VIII. General control of the pinboard switches is explained in the above mentioned copending application of Hoberg et al. Serial No. 492,062. For purpose of understanding the present invention, however, it is only necessary to consider that the automatic scanning in the pinboard will provide at any one time by operation of stepping switches A and I through VIII a particular instruction which will provide respective I, *a* and *b* signals at terminals 154, 156 and 158 for use to control the computer operation.

The indicator lamps shown in Fig. 1 designate by means of stepping switch A2 which pinboard is in use, and by means of stepping switches A3 and sections 4 of stepping switches I through VIII which one of the 16 instruction rows is selected. These lamps are respectively energized at terminals 165 and 166 whenever the stepping switches are in proper position. In the computer described in the above mentioned application, provision is made for special stepping switches designated E and F which are used for remembering a count in iterative or like operations which may be processed in the computer. The indicator arrays are also caused to indicate in which position the stepping switches E and F reside whenever the respective push buttons 163 and 164 are depressed by means of sections 2 of the corresponding stepping switches E and F. In order to provide an indication on the lamps of the position of the memory band connected in by the current positioning of the stepping switch M, therefore both the buttons 163 and 164 are pushed simultaneously to provide an indication on the lights 0 through 3 of the corresponding band indicated by the stepping switch section SSM–3.

The second section of the band stepping switch M is used to provide the band signals for use in the control circuits of Fig. 4 and therefore terminal 170 of Fig. 5 is connected to a suitable relay actuating potential so that the memory bands designated by the position of stepping switch section SSM–2 are connected in the selected position. The desired band selection signal $B_0$ to $B_3$ is generated prior to the instruction I*ab* at band selection waffer switch SSM–2 of Fig. 5 and will remain at the last band selected until modified by the instruction S3*b* or H3*b* as will be explained.

The first section of stepping switch SSM–1 is used for control purposes to permit the stepping switch to be sent to any one of its optional positions in accordance with instructions received at terminal 154. Thus, the output lead of this switch provides an indication M=UL whenever one of the units level signals 0 through 3 is provided at terminal 158 and the stepping switch section is in the corresponding matched position. Thus, the matched signal M=UL is used for two control functions in providing operation in accordance with the following instruction designations:

S3*b*—Step to the next memory band for each operation cycle and proceed to a specified instruction when the position $(b+1)$ is reached, where *b* is 0, 1, 2 or 3.

H3*b*—Where *b* is 0 through 3 the memory switch will be homed to the band designated by the units level *b* signal.

In order to accomplish the operation in accordance with the designated instructions, logical computer circuits are coupled to the M stepping switch solenoid terminal 180. Accordingly, with the receipt of either the stepping instruction S or homing instruction H at the instruction terminal 154, as provided by the mixer circuit 181, together with the TL=3 signal at terminal 156, the M switch will be stepped in accordance with the receipt of two further conditions at the "and" circuit 182. One of these conditions is the provision of signals in one of the four units level slots 0 through 3 as provided by mixer circuit 183. The other condition is controlled within the computer. Thus, the computer must be in a particular condition to permit stepping of a switch which is specified as state "1" in one input terminal of the "and" circuit 184. The other condition at this "and" circuit 184 is a provision of certain solenoid stepping pulses at the proper time which are designated clock pulses (CP). Therefore, as long as the computer is in state "1" with the properly occurring pinboard instructions the memory stepping switch will be advanced upon the receipt of each succeeding clock pulse. To terminate the stepping of the memory switch the computer is switched from state "1" by control circuitry within the computer designated by the block diagram 187 at an appropriate time in the computer timing cycle as provided by the "and" circuit 188. This occurs during the homing instruction whenever the M=UL matched signal is obtained as signified at the mixer circuit 189. However, each time a stepping signal "S" is produced, a single step of the memory switch is produced for each computer cycle since the signal "S" at the mixer circuit 189 results in switching out of the stepping state 1.

In the computer, provision is made for stepping pinboard control during an automatically sequencing operation as signified by the block diagram circuit 190. Thus, depending upon which pinboard is selected by stepping switch section SSA-4, the corresponding stepping switch I through VIII is advanced. As provided by the "and" circuit 191, provided the conditions of circuit 190 are met, the receipt at mixer circuit 192 of either the stepping signal "S" or the matching signal M=UL together with a signal indicating that TL=3 will cause the appropriately selected stepping switch to go to a further pinboard position. Provision is made in the stepping control circuits 190 for the memory of the *b* digit of instruction S3*b* so that a skip of the succeeding instruction is performed at the $(b+1)$ stepping of the band switch.

Accordingly, it is evident that in accordance with the present invention provision is made for providing an expanded memory in an existing computer system without requiring complex or excessive control circuitry. By the provision of substitution of separate memory bands into a part of the existing memory system in accordance with computer instructions, it becomes unnecessary to provide for extension of the memory address control circuits. As a result the proposed system affords a compatible memory of at least two optional capacities with a resulting simplicity of control circuitry necessary.

Having, therefore, indicated the nature of the invention, those features which are believed descriptive of the invention are defined with particularity in the appended claims.

What is claimed is:

1. In a computer system adapted for optional provision of movable multi-track memory mediums providing two different storage capacities, the combination comprising, address selection control circuits for selecting that maximum number of storage addresses in the memory medium of lower capacity as designated by a multi-digit address character, means operable with the memory medium of higher capacity for designating and selecting independently of the addresses a plurality of memory bands each adapted for storage capacity equal to a portion of that of the lower capacity memory medium and having memory addresses corresponding to a part of the storage address positions designated by the multi-digit address character, and switching circuits for substituting selectively under control of the address selection control circuits one of the memory bands for another.

2. In a memory system with means for selecting one of a plurality of channels in a storage device having a number N of fixed channels connected in a common group and a plurality of other groups of P channels connected in common groups, N being greater than P, the combination comprising, separate selection circuits for each of the N channels, means for selecting the N channels with corresponding address orders, circuits interconnecting corresponding P channels of each group for selection commonly by separate ones of N channel selection circuits, means for selecting separate groups of P channels for cooperation with the group of N channels to provide therewith a working register comprising a group of N plus P storage channels, and means responsive to address orders corresponding to the P channels for operating the corresponding ones of the commonly connected N channel selecting circuits and simultaneously transferring control from the groups of N channels to the group of P channels.

3. In a memory section of an electronic computer system, the combination comprising, an instruction repertoire, a multi-digit decimal memory address designation for M memory locations, total memory capacity of $M+X$ memory locations, control circuits for locating the M memory locations in response to the corresponding address designations, control circuit means for substituting different bands within the X memory locations for part of the M memory locations, and means directed by instructions in said repertoire for selecting specified bands with the modified control circuits.

4. In a computer system adapted for optional provision of movable multi-track magnetic mediums providing two different storage capacities, the combination comprising, address selection control circuits for selecting that maximum number of storage addresses in the magnetic medium of lower capacity as designated by a multi-digit address character, means operable with the magnetic medium of higher capacity for designating and selecting independently of the addresses a plurality of memory bands each comprising a plurality of magnetic recording tracks on the magnetic medium and each adapted for storage capacity equal to a portion of that of the lower capacity magnetic medium and having memory addresses corresponding to a part of the storage address positions designated by the multi-digit address character, and switching circuits for substituting selectively under control of the address selection control circuits one of the memory bands for another.

5. In a computer system adapted for optional provision of movable multi-track magnetic mediums providing two different storage capacities, the combination comprising, address selection control circuits for selecting that maximum number of storage addresses in the magnetic medium of lower capacity as designated by a multi-digit address character, means operable with the magnetic medium of higher capacity for designating and selecting independently of the addresses a plurality of memory bands each comprising a plurality of magnetic recording tracks on the magnetic medium and each adapted for storage capacity equal to a portion of that of the lower capacity magnetic medium and having memory addresses corresponding to a part of the storage address positions designated by the multi-digit address character, switching circuits for substituting selectively under control of the address selection control circuits one of the memory bands for another, a transducing device operatively associated with each of said tracks, means for separately selecting each transducing device in tracks not in one of said bands in response to a corresponding address digit, means including common selecting means for a plurality of the last said tracks and those tracks residing in a selected one of the bands, and switching means responsive to band switching instructions for actuating the corresponding one of said bands.

6. In an electronic computer system, the combination comprising, a memory section having a total memory capacity of $M+X$ memory locations, an instruction repertoire, a multi-digit memory address designation for M memory locations, control circuitry for locating the M memory locations in response to the corresponding address designations, control circuitry for substituting different parts of the X memory locations for a part of the M memory locations, and means directed by instructions from said instruction repertoire for selecting specified parts of the X memory locations for operation with the control circuitry for the M memory locations.

7. A data storage system comprising, in combination, a first group of N data storage locations, a plurality of second groups of P data storage locations, switching circuitry provided to scan the N and P data storage locations for any selected location, a multi-position stepping switch coupled to said switching circuitry for specifying a selected one of said second groups of P locations, and control circuits responsive to a special instruction for stepping said stepping switch to the proper position to specify the selected group of P locations.

8. In a data processing system providing a first data storage means and optionally in combination therewith a second data storage means, a data storage address arrangement comprising, address selection control circuits capable of passing a predetermined number of address signals for selecting the address of any data word stored in said first data storage means, each of said predetermined address signals being assigned to a different one of the addresses of the data words stored in said first data storage means, said second data storage means being subdivided into portions each of which has no greater word capacity than said first data storage means, and switching circuitry coupling said second data storage means to said address selection control circuits for selectively substituting any one of said subdivided portions of said second storage means for an equal portion of said first data storage means in order to have the selected subdivided portion respond to said address signals.

9. In a data processing system the combination comprising a memory means having a total memory capacity of N plus P memory locations, an instruction repertoire, a different memory signal address designation for each of said N memory locations, first control circuitry for locating the respective N memory locations in response to corresponding address signals, second control circuitry for interchanging different parts of the P memory locations for a part of the N memory locations, and means directed by instructions from said instruction repertoire for selecting specified parts of the P memory locations for operation with said first control circuitry.

References Cited in the file of this patent

UNITED STATES PATENTS

| | | |
|---|---|---|
| 1,486,379 | Jackson | Mar. 11, 1924 |
| 2,302,769 | Haselton | Nov. 24, 1942 |
| 2,645,764 | McWhirter | July 14, 1953 |
| 2,672,889 | Swanson | Mar. 23, 1954 |